Patented Sept. 30, 1941

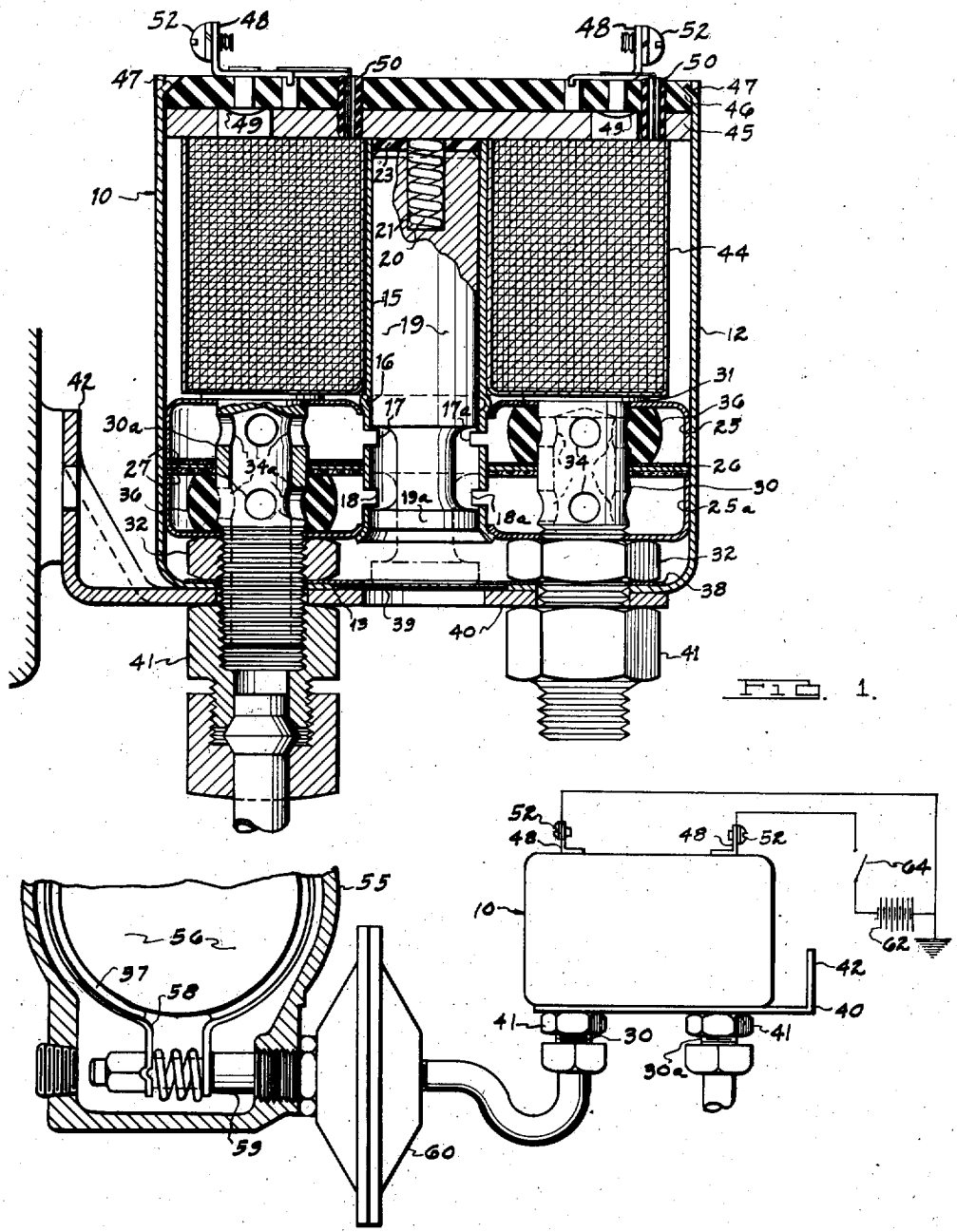

2,257,582

UNITED STATES PATENT OFFICE 2,257,582

UNITARY SOLENOID AND VALVE ASSEMBLY

Odin Werther, Cleveland, Ohio, assignor to Eaton Manufacturing Company, Cleveland, Ohio, a corporation of Ohio Application February 24, 1940, Serial No. 320,531

7 Claims. (Cl. 137—139)

This invention relates generally to solenoids and valves associated therewith but more particularly concerns a solenoid and valve assembly operated thereby which is built into a single compact unit structure.

Among the objects of this invention is the provision of a solenoid and its operating plunger which is associated with an adjacent valve assembly that is all built into a single inherently self-aligned unit principally composed of stamped parts; the provision of a solenoid and valve assembly as above described having interchangeable parts; the provision of a solenoid and valve assembly as above described operable on fluid pressure or vacuum including a built-in air cleaner serving as a damper for the solenoid plunger upon release thereof; the provision of a combination solenoid and valve assembly as above described having a plurality of stamped sheet metal parts which are interchangeable and which present a minimum number of operations to effect a complete assembly thereof; the provision in a combination solenoid and valve housing as above described in which the movable plunger of the solenoid has a minimum distance of travel to cover or uncover the valve ports in the valve housing to admit a maximum volume of operating fluid; the provision in a combination solenoid and valve housing as above described in which the valve ports are so arranged and of suitable size as to equalize pressure upon opposite sides of the solenoid plunger to prevent sticking thereof and to be equal to or greater than the area of the operating fluid inlet channel, thereby constituting a solenoid structure of minimum size and low operating current consumption.

Another object of the invention is the provision of a combination solenoid and valve assembly operated thereby in a compact housing structure that is self-contained in itself and presents a perfectly shielded unit which may be adapted to fit any mounting or installation position by an alteration of its attaching bracket.

Further and other objects and advantages of the invention reside in the novel combination and arrangement of parts hereinafter described, when considered in conjunction with the accompanying drawing forming a part of this specification and pointed out with particularity in the appended claims.

In the drawing like reference characters denote corresponding parts in the several views, and in which:

Fig. 1 is a vertical sectional view through one form of this invention illustrating the solenoid body and valve assembly operated thereby and associated therewith; and Fig. 2 is an elevational view partly in section illustrating the solenoid structure of Fig. 1 incorporated in a system as a shaft brake operating means.

Now having reference to Fig. 1 there is shown a central vertical section through a combination solenoid and valve assembly body generally designated 10. The solenoid 10 may consist of an outer cover housing 12 which is a cylindrical body formed preferably from a light gauge sheet metal stamping deep drawn into a cup shape with an open upper end and a lower base wall in which is pierced an axial aperture 13. The solenoid and valve assembly body generally designated 10 is built around a combination core and valve tube 15, which is preferably formed from standard seamless tubing, and intermediate the ends thereof has an expanded section that forms an annular shoulder 16 on its outer periphery. Below the shoulder 16 two sets of ports are pierced through the wall of the valve tube 15, which consist of two diametrically opposed and elongated sets of slots 17, 17a and 18, 18a that are milled out of the tube wall for a purpose to be hereinafter disclosed. A solenoid plunger 19 slidable in the core tube 15 has an integral valve body 19a on the lower end thereof, which with said plunger 19 controls fluid flow through the two sets of ports 17, 17a and 18, 18a. The plunger 19 is normally seated by gravity but has a light booster spring 20, recessed in an upper axial pocket 21 of the plunger 19, to speed up the plunger action upon release of the solenoid retractive force and to prevent lag due to temperature changes, too close mechanical fitting or sticking of the plunger in the tube. An apertured rubber damper 23 is positioned within the upper end of the tube 15 and serves to cushion the noise and shock occasioned by the plunger 19 being rapidly retracted when the solenoid is electrically energized. Around the lower end of the valve tube 15 is positioned an apertured cup-shaped metal stamping, which forms the upper part of valve housing cover 25, that snugly fits over the outer periphery of the tube 15 with the periphery of the aperture abutting against its shoulder 16, and which has an open lower end whose periphery fits nicely within the outer cover housing 12. A second cup-shaped metal stamping, of identical size, shape, apertures, and interchangeable with upper cover housing 25, forms the lower half of the valve housing cover 25a, and is placed around the valve tube 15 with its upper open end facing the lower open end of the upper cover 25 to completely define a valve housing chamber. Between the upper and lower housing covers 25 and 25a, an annular plate 26 is interposed and divides or partitions the chamber defined by the cover into upper and lower halves of equal size, and gasket members 27 disposed on either side of the plate 26 seal the outer periphery of the valve chamber and the peripheries of the axial and intermediate apertures between the upper and lower halves of the chamber. Accordingly, the chambers so defined are intercommunicated only by the valve tube 15 extending axially therethrough with the ports 17, 17a and 18, 18a in the wall thereof disposed, respectively, in the upper and lower chambers. The lower marginal end of the valve tube 15 is outwardly flared or spun over the rim of the aperture in the lower housing cover 25a to hold the assembly permanently in place.

Within the valve chamber two short sections of hollow tubing 30 and 30a, identical in size, and interchangeable in position, extend through apertures in the upper wall of the cover 25 and depend by an enlarged annular flange 31 at the upper closed ends thereof and have open lower threaded sections projecting through the lower valve cover 25a and below the outer cover housing 12. Threaded nut means 32 drawn up against the lower wall of the valve cover 25a retain the tube sections 30 and 30a in place within the housing, space the valve cover from the bottom of the outer cover 12, and exert an additional fastening means to insure a uniform seal of the valve chambers to prevent loss of operating fluid or air leaks. The hollow tube sections 30 and 30a have two sets of ports 34 and 34a, respectively, comprising openings drilled through the walls of the tubes and spaced substantially at right angles to each other, the spacing between each set of ports is arranged to fall within each of the upper and lower halves of the valve chambers and to correspond substantially with the spacing of ports 17, 17a and 18, 18a. Apertured rubber sleeves or gaskets 36 are fitted around the upper set of ports 34, in the tube section 30, and the lower set of ports 34a, in the tube section 30a, to close off one set of ports in each tube section to secure the desired valve action, as will be presently described, and assist in sealing the adjacent aperture through the valve cover housing against fluid escapement. A thin plate member 38 has a central aperture therethrough slightly greater than the valve foot 19a, aligned therewith and with the air inlet aperture 13 in the outer cover 12, and is positioned upon the free ends of tube sections 30 and 30a adjacent the outer sides of lock nuts 32 and abuts against the inner bottom wall of the cover housing 12 to hold an air filter member 39 in place fitted within the aperture 13 thereof. The air filter 39 is preferably a thin waferlike circular member composed of upper and lower discs of fine wire-mesh screen between which is interposed a layer of cotton or porous filter paper. In addition to functioning as an air filter unit to insure that no foreign particles may enter the housing 12 which might clog the valve tube or valve ports, it also acts as a noise damper to cushion the fall and seat the solenoid plunger 19 when it drops down to its lower position upon the solenoid being deenergized. An apertured bracket member 40 fitted over the pipes 30 and 30a, has an aperture smaller in size than the filter member 39 and in line therewith below the base wall of the cover housing 12 to support the same, and is fastened to the housing by the clamp nuts 41 which may include any form of adapters to fit a flexible hose, threaded joint or rubber hose connections. An upstanding arm 42 of the mounting bracket 40 is arranged for attachment to any suitable supporting means as the installation may require.

The windings of wire 44 comprising the solenoid proper are annularly wound and slipped upon the core and valve tube 19 above the valve chambers 25 and 25a; and over the solenoid is seated an annular magnetic amplifier 45 which is formed of soft steel or the like to increase or strengthen the magnetic flux of the solenoid. Upon the magnetic amplifier 45 is seated an annular terminal block or cover 46 to close the upper end of the housing 12 and which is held in place by a plurality of ears or lugs 47 bent therefrom. Terminals 48 are fastened by rivets 49 or other suitable fastening means, to the fibre or hard rubber terminal block 46, and the inner and outer lead wires from the solenoid 44 are threaded through insulated sleeves 50 thereto and fastened. Fastening means 52 threaded into the terminals 48 are connected with a source of power, such as an electric battery shown diagrammatically in Fig. 2.

In assembling the solenoid and valve assembly body, generally designated 10, the core and valve tube 15 is initially secured in aligned relation with the upper valve cover housing 25. The tube sections 30 and 30a are inserted through apertures in the valve cover housing 25 with the lower threaded ends depending and the closed upper flanged ends 31 seated on the top wall of the cover. Over the tube 30, used as an inlet channel, the upper set of ports 34 therein are closed off by rubber bushing or gasket 36, the gasket 27 is threaded over the tube ends and abuts against the bushing 36; the dividing plate 26 comes next in order, then another gasket 27 abuts against the lower face thereof, and a second rubber bushing 36 closes off the lower set of ports 34a in the outlet tube 30a, after which the lower half of the valve cover housing 25a is threaded, open end up, on the valve tube 15 and pipes 30 and 30a. The lower marginal edge of the valve tube 15 is then flared out or spun over the adjacent outer wall of the cover 25a to hold the sub-assembly tightly in place on the tube, and clamp nuts 32 threaded on tube sections 30 and 30a fix these members in position in the sub-assembly and serve as spacers to fix the distance from the lower wall of the sub-assembly to the base wall of the outer cover housing 12 which extends therearound and below. Air cleaner retainer plate 38 is next threaded over the tube sections and the outer cover housing 12 also threaded thereover with the open end up, after which air cleaner 39 is introduced in the aperture 13, of the cover 39, and the mounting bracket 40 fastened in place over the lower face of the base wall of outer cover housing 12 to hold the air cleaner in place and which in turn is held in place by clamp nuts and/or adapters 41.

The prewound solenoid 44 is slipped over the core tube 15, the plunger and valve body 19, 19a, placed therein, and the release spring 20 and rubber damper 23 inserted in the upper ends of the plunger 19 and core tube 15, respectively. The annular magnetic amplifier 45 is seated upon the upper end of the solenoid 44, the terminal block 46 thereover, the inner and outer lead wires from the solenoid threaded through upstanding insulated sleeves 50 to terminals 48 riveted in the terminal block where they are fastened, and the ears 47, of the outer cover housing 12, bent over to secure the whole assembly as a unit.

The axially spaced elongated slots 17, 17a and 18, 18a, each of which provides a set of valve ports, are formed by a milling operation through diametrically opposite sections of the valve tube wall whereby side thrusts are equalized or balanced by fluid pressure or suction upon opposite sides of the valve body 19a, integral with solenoid plunger 19, to prevent sticking thereof to the valve tube 15; and to provide substantially the same or greater area than that of the inlet or outlet tube 30 and 30a. In this manner the desired area of the ports can be obtained in narrow elongated slots, as distinguished from relatively large circular apertures, and the operating plunger 19, including the valve body 19a integral therewith, need only move a very short distance, with a minimum current consumption, to cover or uncover the ports.

In Fig. 2 there is shown the solenoid and valve assembly, generally designated 10, joined in a series with a shaft brake controlling mechanism. The shaft brake and component parts may consist of a brake housing 55, brake drum 56, and its circumscribed brake band 57, with brake shoe 58 secured thereto. A brake operating lever 59 connected to the shoe 58 is suitably linked with a diaphragm 60 adapted to operate the same in a well known manner under the influence of a pressure fluid or vacuum. The diaphragm 60 in this instance is vacuum operated and is connected to the solenoid body 10 by the clamp nut and adapter 41 on the inlet tube section 30. The opposite tube section 30a is connected through a similar clamp nut and joined to a source of vacuum, for example the intake manifold of an associated internal combustion engine, not shown. The terminals 48 are connected by lead wires clamped thereto by the fastening means 52 across an electric battery diagrammatically illustrated at 62; one of the lead wires being interrupted by a switch 64 to open or close the circuit at will.

The operation of the solenoid and valve is as follows: when the switch 64 is closed current flows through the solenoid windings 44 and the magnetic flux generated attracts the solenoid plunger 19 and causes it to be drawn upward in the core tube 15 a short distance of travel until the plunger collapses the spring 20 and abuts against the rubber cushion 23, as shown. In this location the plunger 19, and the valve body 19a integral therewith, has assumed a position in which the air inlet opening 13 through cover housing 12, with the air filter 39 therein, is closed from communication with the interior of the valve chamber by the foot of the valve 19a at the entrance to the lower end of valve tube 15. The ports 17, 17a are in communication with the tube section 30a, and ports 34a therein, which is in communication with a source of vacuum, as the intake manifold of an engine. The ports 18, 18a register with the inlet tube section 30, and ports 34 therein, which is connected with the work, in this case diaphragm 60 and brake lever 59. Under these conditions with the vacuum line being in direct communication with the brake lever 59, through the diaphragm and bellows therein, it will be collapsed and the brake applied. Upon the switch 64 being opened the solenoid is deenergized and the solenoid plunger 19 drops by gravity, and assisted by the spring 20, quickly to the bottom of the outer cover housing 12 where its fall is cushioned and stopped by the air filter 39 disposed transversely in the atmospheric opening 13. It will be observed the foot of the valve body 19a, shown by broken lines in its lowest position, is smaller in circumference than the periphery of the filtered air inlet opening 13 therefore air may enter therearound, and since the ports 18, 18a are in communication therewith and the tube section 30 is thus vented to the atmosphere the suction on the diaphragm in series therewith will be broken and free to breath and the brake released. Likewise, in this lower position of the plunger 19 the upper end of the valve body 19a has simultaneously closed off communication of the upper set of ports 17, 17a with the atmosphere and sealed the tube section 30a and ports 34a therein, so as not to open the vacuum line from the intake manifold of the engine to the atmosphere. It will now be apparent from this arrangement of valve porting, and by the use of rubber bushings placed over the upper and lower sets of ports in the inlet and outlet tube sections, respectively, that the solenoid plunger in a short operating travel accomplishes two functions, that of venting the unit to the atmosphere and regulating the passage of operating fluid through the unit; and additionally affords interchangeability of the parts. Further, since the solenoid plunger travels only a short distance, and is balanced on opposite sides against fluid pressure, only a minimum current consumption is necessary.

From the foregoing disclosures it will be seen that a combination solenoid and valve assembly operated thereby have been built into a single, compact, inherently self-aligned unit formed for the most part of stamped and interchangeable parts, as distinguished from devices of this type heretofore known, and accomplishing among other things the objects and advantages of the invention first enumerated. It is to be understood, however, that the specific form of the invention disclosed is merely for purposes of illustration and is not intended in a limiting sense as many modifications will present themselves in practice which may fairly come within the scope of this invention as defined in the following claims.

What I claim is:

1. In combination a solenoid actuated valve assembly including a sheet metal cover housing the same, said solenoid comprising an axial core tube with solenoid windings around its outer periphery on the upper section thereof and axially spaced sets of ported openings through the lower section thereof, a stamped valve housing fixed around the lower section of the core tube including a partition therein segregating said ported openings into separate chambers concentrically surrounding said core tube, a solenoid actuated plunger within said core tube including an integral valve body adjacent one end thereof adapted to uncover or cover at will at least one set of said ported openings to the valve chambers upon the solenoid being energized or deenergized, and inlet and outlet tubes to and from said valve chambers having ports therein for passage of an operating medium therebetween according to the setting of said solenoid plunger.

2. In combination a solenoid actuated valve assembly including a sheet metal cover housing the same, said solenoid comprising an axial core tube with solenoid windings around its outer periphery on the upper section thereof and axially spaced sets of ported openings through the lower section thereof, a valve housing fixed around the lower section of the core tube including a partition therein segregating said ported openings into separate chambers concentrically surrounding said core tube, the lower end of said core tube and attached valve housing disposed in spaced relation to the base wall of said outer sheet metal cover housing the same including a lower open end in said core tube overlying an atmospheric opening in said outer cover housing, a solenoid actuated plunger within said core tube including an integral valve body adjacent one end thereof adapted to uncover or cover at will at least one set of said ported openings to the valve chambers upon the solenoid being energized or deenergized, and inlet and outlet tubes to and from said valve chambers having ports therein for passage of an operating medium therebetween or said inlet tube vented to the atmosphere according to the setting of said solenoid plunger.

3. In combination a solenoid actuated valve assembly including a sheet metal cover housing the same, said solenoid comprising an axial core tube with solenoid windings around its outer periphery on the upper section thereof and axially spaced sets of ported openings through the lower section thereof, a valve housing fixed around the lower section of the core tube including a partition therein segregating said ported openings into separate chambers concentrically surrounding said core tube, the lower end of said core tube and attached valve housing disposed in spaced relation to the base wall of said outer sheet metal cover housing the same including a lower open end in said core tube overlying an atmospheric opening in said outer cover housing, a solenoid actuated plunger within said core tube including an integral valve body adjacent one end thereof adapted to uncover or cover at will at least one set of said ported openings to the valve chambers upon the solenoid being energized or deenergized, inlet and outlet tubes to and from said valve chambers having ports therein for passage of an operating medium therebetween or said inlet tube vented to the atmosphere according to the setting of said solenoid plunger, and said atmospheric opening having a transversely disposed air filter fixed thereacross adapted as a cushioned stop in the lowermost position of the solenoid plunger.

4. A unitary solenoid actuated valve assembly according to claim 1, in which the stamped valve housing is formed of interchangeable cup shaped portions secured together at the open ends to an annular plate section partitioning the housing so formed into upper and lower chambers concentrically surrounding the solenoid core tube.

5. A unitary solenoid actuated valve assembly according to claim 1, in which the stamped portions secured to the core tube and forming the valve housing including the several members fixed therein or thereto are preformed and interchangeable.

6. The combination with an annular solenoid including a magnetic amplifier adjacent thereto and a terminal block disposed thereover for reception of the leads from said solenoid and adapted to be connected to a power source, of an annular core tube disposed partially within said solenoid and having a solenoid actuated plunger therein including an integral valve body on one end thereof, said core tube having axially spaced sets of ported openings through its wall in the lower portion thereof intercommunicated in one setting by the valve body of said solenoid plunger, an annular valve housing fixed to said core tube below said solenoid and concentrically surrounding said ports therein including a partition in said housing segregating said ports into separate chambers therein, inlet and outlet conduits to and from said valve chambers having ports therein in communication with each other according to the location of said valve body on the solenoid plunger with respect to at least one set of the ports in said core tube, and an annular outer cover enveloping said valve housing and solenoid having an open upper end with integral lugs bent therefrom and overlying said terminal block to retain the assembly therein.

7. In an annular solenoid assembly including terminals therefor arranged to be connected to a power source for actuating an associated vacuum valve, a sub-assembly comprising a tube arranged to be partially disposed within said solenoid and having axially spaced ported openings in the tube wall below said solenoid concentrically surrounded by a partitioned vacuum chamber fixed thereto with inlet and outlet ported conduits therein including a plunger movable in said tube under the influence of said solenoid and having a lower integral grooved valve section adapted to intercommunicate said ported openings in the tube wall and said ported inlet and outlet conduits in the valve chamber when the solenoid is energized, and an outer housing for enveloping and retaining said solenoid assembly and sub-assembly with the vacuum valve operated thereby including an exhaust opening in said outer housing for venting the inlet port of said vacuum chamber to the atmosphere when the unit is inactive.

ODIN WERTHER.